United States Patent
Lai et al.

(10) Patent No.: US 7,096,006 B2
(45) Date of Patent: Aug. 22, 2006

(54) METHOD OF PLAYING INSTANT GAME ON WIRELESS NETWORK TERMINAL DEVICE

(75) Inventors: Shing Cheng Lai, Taipei Hsien (TW); Dong Ji Qin, Nanking (CN); Long Xiao Fan, Nanking (CN)

(73) Assignee: Inventec Appliances Corp., Taipei Hsien (TW)

( * ) Notice: Subject to any disclaimer, the term of this patent is extended or adjusted under 35 U.S.C. 154(b) by 541 days.

(21) Appl. No.: 10/394,046

(22) Filed: Mar. 24, 2003

(65) Prior Publication Data

US 2004/0192366 A1    Sep. 30, 2004

(51) Int. Cl.
*H04M 1/00* (2006.01)
*H04M 3/42* (2006.01)
*H04B 1/38* (2006.01)

(52) U.S. Cl. ............... 455/412.1; 455/414.1; 455/416; 455/557; 455/344; 455/41.2; 709/217; 709/223

(58) Field of Classification Search ............ 455/412.1, 455/414.1, 416, 41.2, 466, 556.1, 557, 90.2, 455/344; 463/16–20, 40, 42; 709/217, 223
See application file for complete search history.

(56) References Cited

U.S. PATENT DOCUMENTS

| | | | | |
|---|---|---|---|---|
| 5,738,583 A | * | 4/1998 | Comas et al. | 463/40 |
| 5,797,085 A | * | 8/1998 | Beuk et al. | 455/88 |
| 6,383,075 B1 | * | 5/2002 | Jeong et al. | 463/39 |
| 6,524,189 B1 | * | 2/2003 | Rautila | 463/40 |
| 6,816,913 B1 | * | 11/2004 | Liebenow | 709/239 |
| 6,908,389 B1 | * | 6/2005 | Puskala | 463/40 |

* cited by examiner

*Primary Examiner*—Edan Orgad
(74) *Attorney, Agent, or Firm*—Bacon & Thomas, PLLC

(57) ABSTRACT

The present invention discloses a method of playing an instant game on a wireless network terminal device by installing a network connection software in a wireless network terminal device, so that the wireless network terminal device can use the network connection software to connect to a network and let it be allocated to a network address and defined as a game host in order to create and play an instant game without going through the traditional network server and the network address of the network server.

4 Claims, 3 Drawing Sheets

METHOD OF PLAYING INSTANT GAME ON WIRELESS NETWORK TERMINAL DEVICE

BACKGROUND OF THE INVENTION

1. Field of the Invention

The present invention relates to a method of playing an instant game on wireless network terminal device.

2. Description of the Related Art

Nowadays, the online game industry is blooming, and the selling price of all kinds of games is getting cheaper. Every software game developer constantly introduces new software games to cope with such trends, which is quite welcome by the consumers. Furthermore, every software game developer constantly increases the quantity of network servers for the game to meet the demand of the fast growth of game players, and expects the game player to enjoy the best quality of games.

The online game is constructed on at least one network server and a plurality of computers, and those computers and network servers are connected to Internet through a cable, so that the computers through its network can access the fixed network address owned by the network server address, and enable the computer and network server to transmit data through such two network addresses and play the instant online game.

However, such software game developers keep on increasing the number of network servers and paying attention to the online quality of the game, but neglecting the cost of purchasing and maintaining the network server if a game does not require the functions of such a powerful network server and high quality of online connection. Such cost is a burden or even a waste of resources. Therefore, everyone would love to have an online game that does not require a network server to provide a fixed network address to process the exchange of various information and play the game, or even any wireless network terminal device (such as a flat panel computer, PDA, or handset, etc.) can construct a wireless network to play the online game without using a network server. Such arrangement can bring the software game developers another online game business opportunity.

SUMMARY OF THE INVENTION

In view of the traditional online game which requires a fixed network address provided by a network server to process various information exchange and has the shortcoming of bearing an expensive cost of purchasing and maintaining such network server, the inventor of the present invention conducted extensive studies and experiments and finally invented a method of playing instant games on wireless network terminal device in accordance with the present invention. Such method installs a network connection software in a wireless network terminal device, so that the wireless network terminal device can use the network connection software to connect to a network and let it be allocated to a network address and defined as a game host in order to create an instant game. Thus, the wireless network terminal device can provide at least one of the other wireless network terminal devices having the network connection software to join or exit such instant game, and also take care of the data processing for playing the instant game between a wireless network terminal device and the other wireless network terminal device.

The primary objective of the present invention is to provide a method of playing instant games on a wireless network terminal device without going through the traditional network server and the network address of the network server.

To make it easier for our examiner to understand the objective of the invention, its structure, innovative features, and performance, we use a preferred embodiment together with the attached drawings for the detailed description of the invention.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
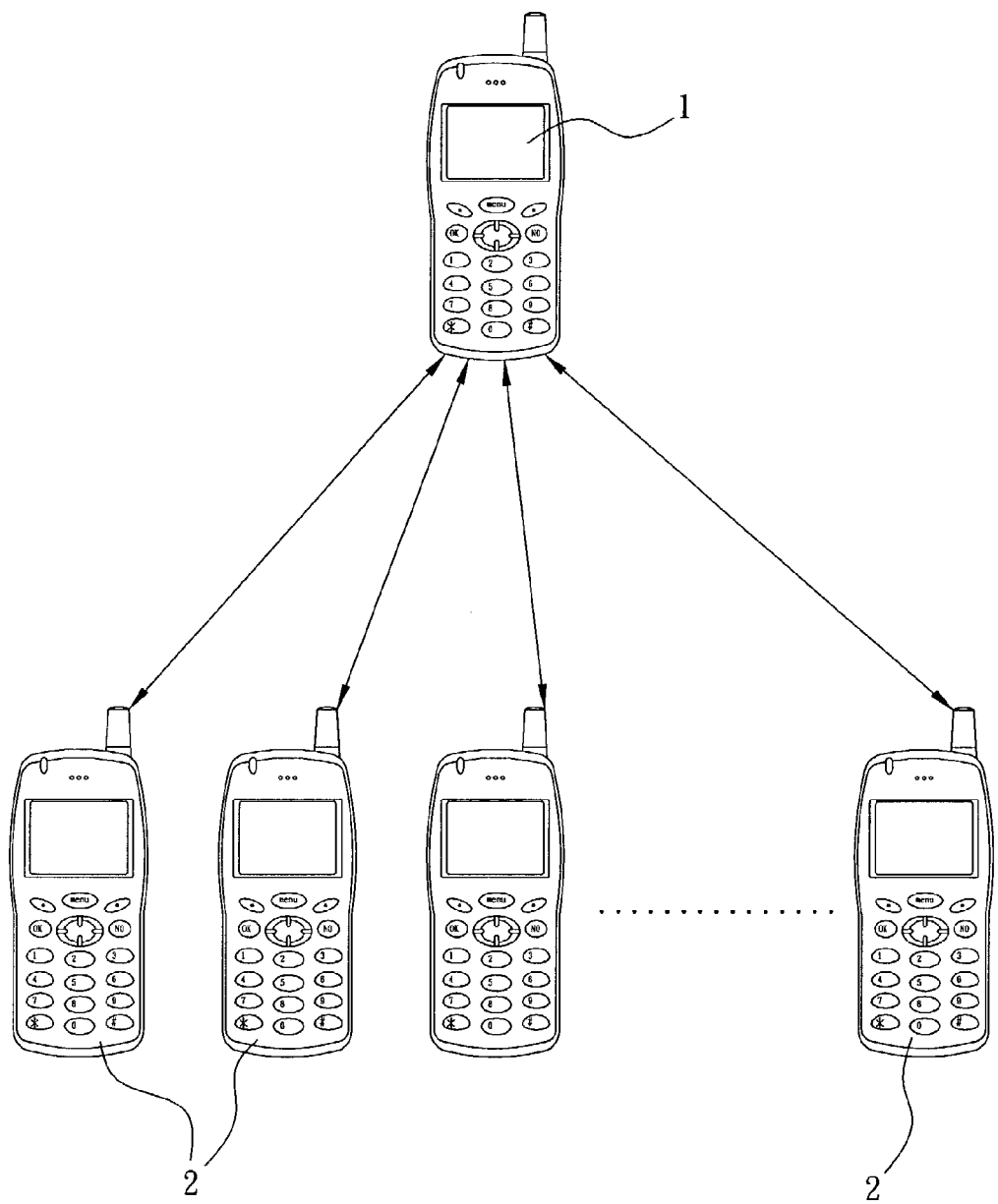
FIG. 1 is an illustrative diagram of the structure of the present invention.

Please refer to the FIG. 1 for a method of playing instant games on a wireless network terminal device. Such method installs a network connection software in a wireless network terminal device 1, so that the wireless network terminal device 1 can use such software connection software to connect to a network (such as Internet or local area network) and allocated to a network address (such as Internet Protocol Address or abbreviated as IP Address) to form a game host and create an instant game. At least one of other wireless network terminal device 2 having the software connection software can use its network connection software to be connected to such network and allocated to another IP address capable of finding such instant game, so that the other wireless network terminal device 2 can join or exit such instant game through such network address and become a client to the game host. Thus, when a game is played between the wireless network terminal device 1 and another wireless network terminal device 2, the wireless network terminal device 1 is responsible for managing the data processing of the instant game, and thus achieving the purpose of playing instant games by connecting a plurality of wireless network terminal devices 1.

Since the wireless network terminal device 1 and the other wireless network terminal device 2 transmit signals via the network connection software between the IP address and another IP address, which forms a small user-constructed network by itself. Therefore the master of the small user-constructed network is responsible for the transmission of various data for the wireless network terminal device 1 within the small user-constructed network. The other wireless network terminal device 2 is the slave of the small user-constructed network. Each of the other wireless network terminal devices 2 is unable to transmit signals to each other. The transmission of signals between the wireless network terminal device 1 and the other wireless network terminal device 2 within the small user-constructed network is through the wireless network terminal device 1 and the other wireless network terminal device 2 within the small user-constructed network, so that the wireless network terminal device 1 and the other wireless network terminal device 2 within the small user-constructed network can process the data update synchronously in order to prevent errors in the data transmission caused by the asynchronous data update between the wireless network terminal device 1 and the other wireless network terminal device 2 within the small user-constructed network.

To enable the wireless network terminal device 1 which completes the construction of the instant game to notice another connected wireless network terminal device 2 to join the instant game, the wireless network terminal device 1 of the present invention can search any other connected wireless network terminal device 2 after constructing the instant game, and obtain another IP address of the other wireless network terminal device 2, so that the wireless network terminal device 1 can send out a notice signal from its IP address to the IP address of the other wireless network terminal device 2. The other wireless network terminal device 2 knows that there is an instant game constructed after receiving such notice signal.

In the present invention, when an instant game is played between the wireless network terminal device 1 and the other wireless network terminal device 2, the two respectively use their network connection software to send a short message or voice message for communication.

Figure 2:
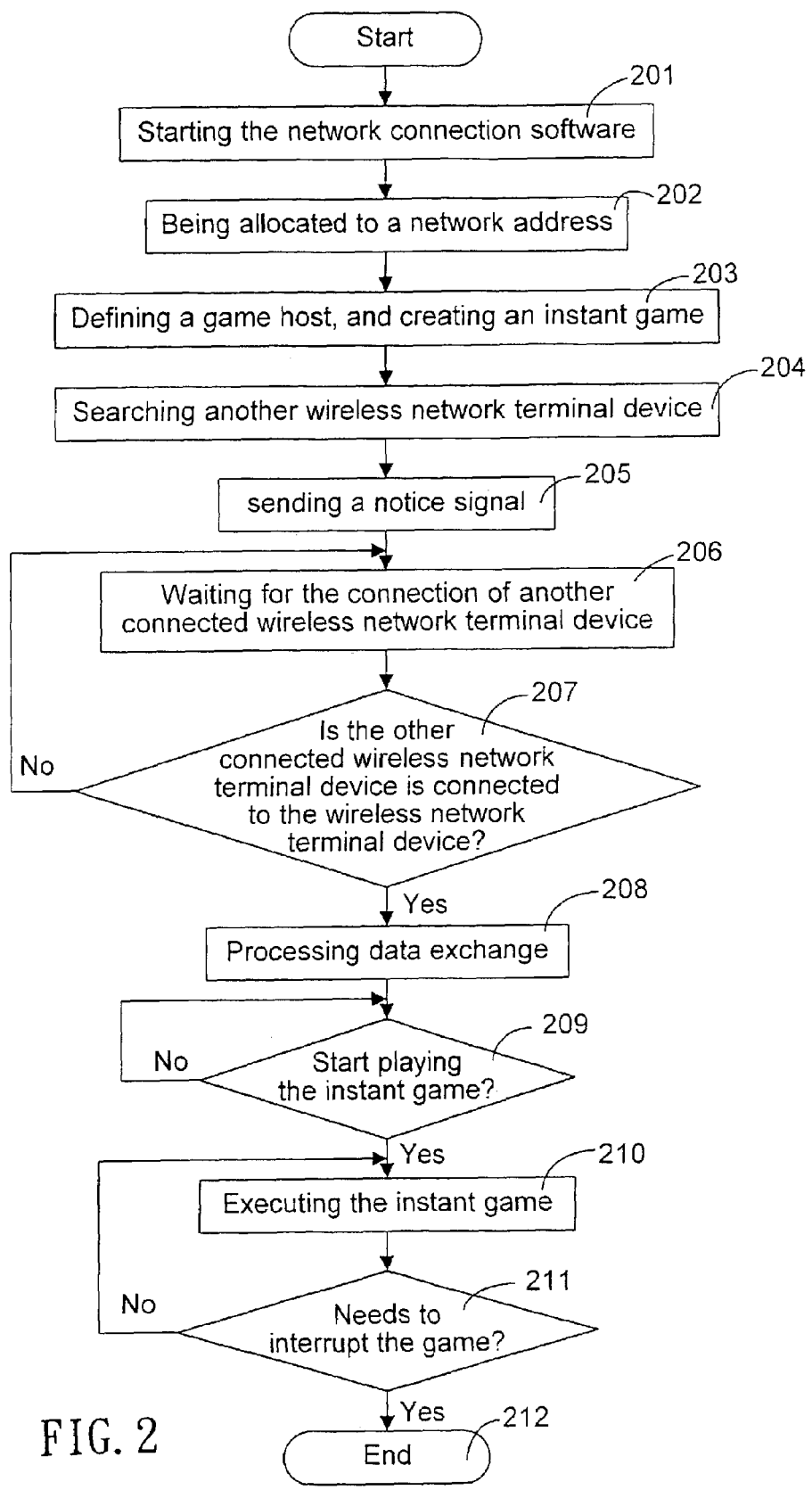
FIG. 2 is a flow chart of the actions of the wireless terminal device according to the present invention.

Please refer to FIG. 2 for the control procedure of the wireless network terminal device 1. Such procedure comprises the steps of:

Step 201: starting the network connection software to connect to a network;

Step 202: being allocated to a network address after the connection to such network is confirmed;

Step 203: defining said wireless network terminal device 1 as a game host, and creating an instant game;

Step 204: searching another wireless network terminal device 2 currently connected to said network, and obtaining another network address of the other wireless network terminal device 2;

Step 205: said wireless network terminal device 1 from its network address sending a notice signal to another wireless network terminal device 2, so that another wireless network terminal device 2 knows that an instant game is constructed after receiving the notice signal;

Step 206: waiting for the connection of another connected wireless network terminal device 2;

Step 207: determining whether the other connected wireless network terminal device 2 is connected to the wireless network terminal device 1; if yes, go to Step 208, or else go to Step 206;

Step 208: said wireless network terminal device 1 using said network connection software to memorize the other network address and process the data exchange;

Step 209: determining whether there is enough other wireless network terminal device 2 to start playing the instant game; if yes, go to Step 210, or else go to Step 209;

Step 210: executing the instant game;

Step 211: determining whether it needs to interrupt the game; if yes, go to Step 212, or else go to 210;

Step 212: ending the instant game.

Figure 3:
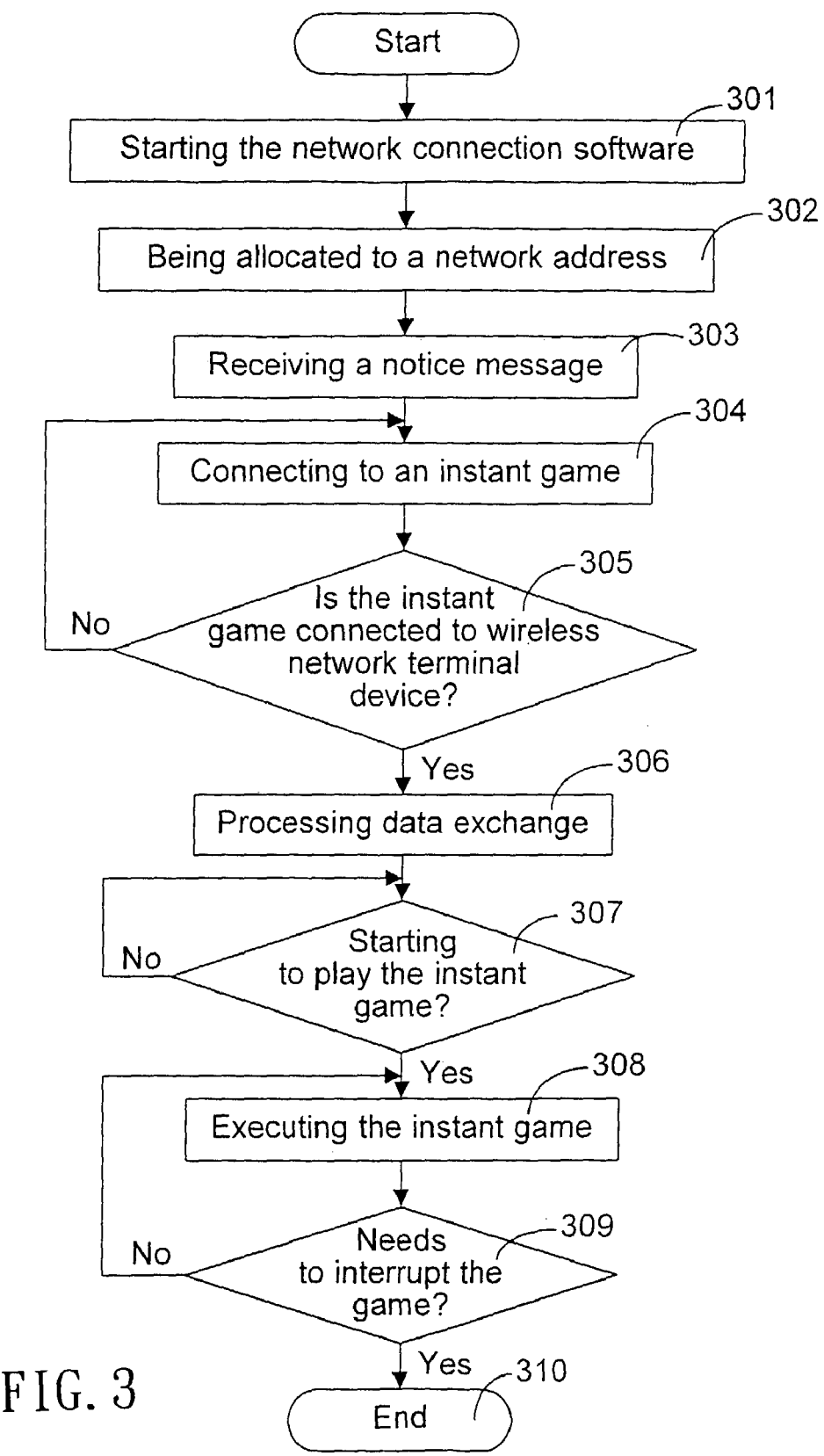
FIG. 3 is a flow chart of the actions of another wireless network server according to the present invention.

Please refer to FIG. 3. The procedure for the other wireless network terminal device 2 connects and plays the game with said wireless network terminal device 1 comprising the steps of:

Step 301: starting the network connection software to connect to a network;

Step 302: being allocated to a network address after the connection to such network is confirmed;

Step 303: receiving the notice message of all instant games from said network to obtain all network addresses corresponding to the wireless network terminal device 1 of the instant game;

Step 304: selecting to connect to one of the instant games;

Step 305: determining whether it is connected to wireless network terminal device 1; if yes, go to Step 306, or else go to Step 304;

Step 306: said other wireless network terminal device 2 using said network connection software to memorize the network address of the wireless network terminal device 1 corresponding to the selected instant game, and processing the data exchange;

Step 307: determining whether or not to start the instant game; if yes, go to Step 308, or else go to Step 307;

Step 308: executing the instant game;

Step 309: determining whether it needs to interrupt the game; if yes, go to Step 310, or else go to Step 308;

Step 310: ending the instant game.

From the above description, it is known that said wireless network terminal device 1 and said another wireless network terminal device 2 can construct their own small network, and play the instant game without a network server or the fixed network address of said network server, and thus greatly lowering the cost for the software game developers.

While the invention herein disclosed has been described by means of specific embodiments, numerous modifications and variations could be made thereto by those skilled in the art without departing from the scope and spirit of the invention set forth in the claims.

What is claimed is:

1. A method of playing instant games on a wireless network terminal device by installing a network connection software in the wireless network terminal device, enabling said wireless network terminal device to carry out the steps of:

connecting to a network;

being allocated a network address after connection to said network is confirmed;

being defined as a game host for creating an instant game and managing data processing of the instant game played between said wireless network terminal device and at least one other wireless network terminal device in which a network connection software is installed, said at least one other wireless network terminal device being connected to the network and allocated another network address, such that said other wireless network terminal device is able to join and exit the instant game through said another network address; and searching said other wireless network terminal device currently connected to said network and obtaining said another network address of said other wireless network terminal device after the instant game is constructed, so as to send a notice signal from said network address of said wireless network terminal device to said another network address of said other wireless network terminal device, enabling said other wireless network terminal device to know that said instant game is constructed after receiving said notice signal.

2. The method of playing instant games on a wireless network terminal device of claims 1, wherein said wireless network terminal device and said other wireless network terminal device respectively use their network connection software to send a short message for communication when an instant game is played between said wireless network terminal device and said other network terminal device.

3. The method of playing instant games on a wireless network terminal device of claim 1, wherein said wireless network terminal device and said other wireless network terminal device respectively use their network connection software to send a voice message for communication when an instant game is played between said wireless network terminal device and said other network terminal device.

4. The method of playing instant games on a wireless network terminal device of claim 1, further comprising the steps of:
  waiting for the connection of said at least one other connected wireless network terminal device;
  determining whether said at least one other connected wireless network terminal device is connected to the wireless network terminal device;
  using said network connection software to memorize the network address of said at least one other wireless network terminal device if the other connected wireless network terminal device is connected to the wireless network terminal device;
  determining whether there is enough of said at least one other wireless network terminal device to start playing said instant game;
  executing said instant game if there is enough of said at least one other wireless network terminal device;
  determining if the instant game needs to be interrupted;
  ending said instant game if the instant game needs to be interrupted.

* * * * *